United States Patent [19]
Parrish et al.

[11] Patent Number: 5,990,250
[45] Date of Patent: Nov. 23, 1999

[54] METHOD OF FLUIDIZED BED TEMPERATURE CONTROL

[75] Inventors: John Roberts Parrish, Cross Lanes, W. Va.; August Joseph Boldt, Inez, Tex.; Thomas James McNeil, Hurricane; Ivan Jeremy Hartley, St Albans, both of W. Va.

[73] Assignee: Union Carbide Chemicals & Plastics Technology Corporation, Danbury, Conn.

[21] Appl. No.: 08/866,637

[22] Filed: May 30, 1997

[51] Int. Cl.$^6$ ........................................................ C08F 2/00
[52] U.S. Cl. ................................ 526/61; 526/88; 526/901
[58] Field of Search ................................. 526/61, 88, 901

[56] References Cited

U.S. PATENT DOCUMENTS

| | | | |
|---|---|---|---|
| 5,191,521 | 3/1993 | Brosilow | 364/160 |
| 5,306,792 | 4/1994 | Havas et al. | 526/106 |

*Primary Examiner*—David W. Wu
*Assistant Examiner*—Ling-Siu Choi
*Attorney, Agent, or Firm*—B. L. Deppenbrock

[57] ABSTRACT

An improved method of bed temperature control is provided by the coordinated manipulation of the water flow rate in one or more heat exchangers and cycle gas flow rate to the reactor.

10 Claims, 3 Drawing Sheets

Figure 1 (Prior Art Method)

METHOD OF FLUIDIZED BED TEMPERATURE CONTROL

FIELD OF THE INVENTION

This invention relates to improved control of the temperature of a fluidized bed by manipulation of the cooling water flow and the recycle gas flow during olefin and/or diolefin polymerizations.

BACKGROUND OF THE INVENTION

The polymer industry is constantly seeking to improve resin properties while maintaining or increasing polymer production. However, to avoid the risk of unplanned reactor shutdown, commercial reactors are typically operated at less than maximum production rates.

The production of off-grade polymer, that is, polymer not having the desired product properties, is due in large part to fluctuations or excursions in bed temperature during regular commercial operations. If the variation in the temperature of the fluidized bed during polymerization is too large, an unplanned reactor shutdown can result. Indeed, most unplanned reactor shutdowns are usually due to a variation in one or more operating constraints caused at least in part by inadequate temperature control of the fluidized bed.

Commercially, bed temperature control is accomplished by removing heat from the fluidizing or cycle gas via one or more water cooled heat exchangers. In this heat exchange system, the water flow is manipulated to remove heat from the cycle gas as the polymerization progresses. Typically, the water flow rate is increased in response to a rise in temperature of the cycle gas or the water flow rate is lowered in response to a decrease in temperature of the cycle gas. Generally, during polymerization there is a direct correlation of the cycle gas temperature and the temperature of the fluidized bed.

Temperature control for commercial operation as presently practiced is set forth schematically in FIG. 1. In this reactor system, warm cycle gas leaves the top of the reactor, passes through a compressor to a cooling tower in a heat exchanger, and, thence, cooled cycle gas returns to the bottom of the reactor. In FIG. 1, heat is removed from the cycle gas via a water cooled heat exchanger. The water flow to the heat exchanger is manipulated to remove heat from the cycle gas by adjusting the water flow valve (9) in response to temperature excursions as monitored by a temperature controller (4). That is, historically, bed temperature control is achieved through manipulation of the cycle gas heat alone. Heat removal from the cycle gas stream in this manner is a relatively slow process allowing significant variation in the bed temperature to occur. In the conventional system, water flow to the heat exchange system was manipulated to remove the cycle gas heat, while the cycle gas flow to and from the fluidized bed of the reactor is kept at a desired fixed (i.e., constant) value for any given polymerization process. Often, the cycle gas flow control element is kept fixed which in turn approximately fixes the gas cycle flow. In this bed temperature control configuration, bed temperature control was limited (i.e., provided a sluggish response) due to the slow dynamics of the water cooling system.

Accordingly, there is an on-going need for improved bed temperature control to provide improved control of product properties while maintaining or increasing production rates.

SUMMARY OF THE INVENTION

It is an object of the present invention to provide improved product property control by more effectively controlling bed temperature. Using the present invention, it is also possible to operate at higher production rates, since process limits can be more closely approached when bed temperature is more readily controlled. The probability of large temperature excursions and the resulting operating disruptions are reduced with the improved bed temperature control of the present invention. These and other objects are accomplished in the present invention by the simultaneous and coordinated manipulation of the water flow rate and the cycle gas flow rate to control bed temperature.

The invention is a continuous process for the polymerization of (a) one or more alpha olefins, and optionally at least one diene, or (b) a diolefin in a gas phase fluidized bed reactor or a stirred-tank reactor having means for manipulating cooling of the cycle gas, in the presence of a polymerization catalyst, optionally in the presence of an inert particulate material, under polymerization conditions including a target reaction temperature, pressure, cycle (recycle) flow rate, cooling water flow rate for desired resin properties, comprising the steps of:

(i) establishing limits for cycle gas flow to provide desired fluidization;

(ii) establishing desired reactor bed temperature;

(iii) determining the actual bed temperature as the polymerization reaction progresses;

(iv) determining the water flow rate required to (a) bring the bed temperature into line with desired bed temperature, and (b) bringing the cycle gas flow rate to the target cycle gas position;

(v) determining the cycle gas valve (or other flow manipulating element) position or cycle gas flow rate required to bring the actual bed temperature in line with desired bed temperature;

(vi) if there is an inner loop, then determining the valve position to give desired cycle flow;

(vii) manipulating water valve and cycle gas valve by amounts necessary to satisfy the proceeding steps; and optionally (viii) adjusting the target cycle gas velocity position to effect reactor fluidization properties.

BRIEF DESCRIPTION OF THE DRAWINGS

In FIGS. 1 and 2, 1=reactor; 2=fluidized section of reactor; 3=disentrainment section of reactor; 4, 4A, and 4B each= temperature controller(s); 5=cycle (recycle) line; 6=compressor(s); 7=heat exchanger(s); 8=cycle gas valve; 9=water flow valve; and 10=temperature control set point.

DETAILED DESCRIPTION OF THE INVENTION

Figure 1:
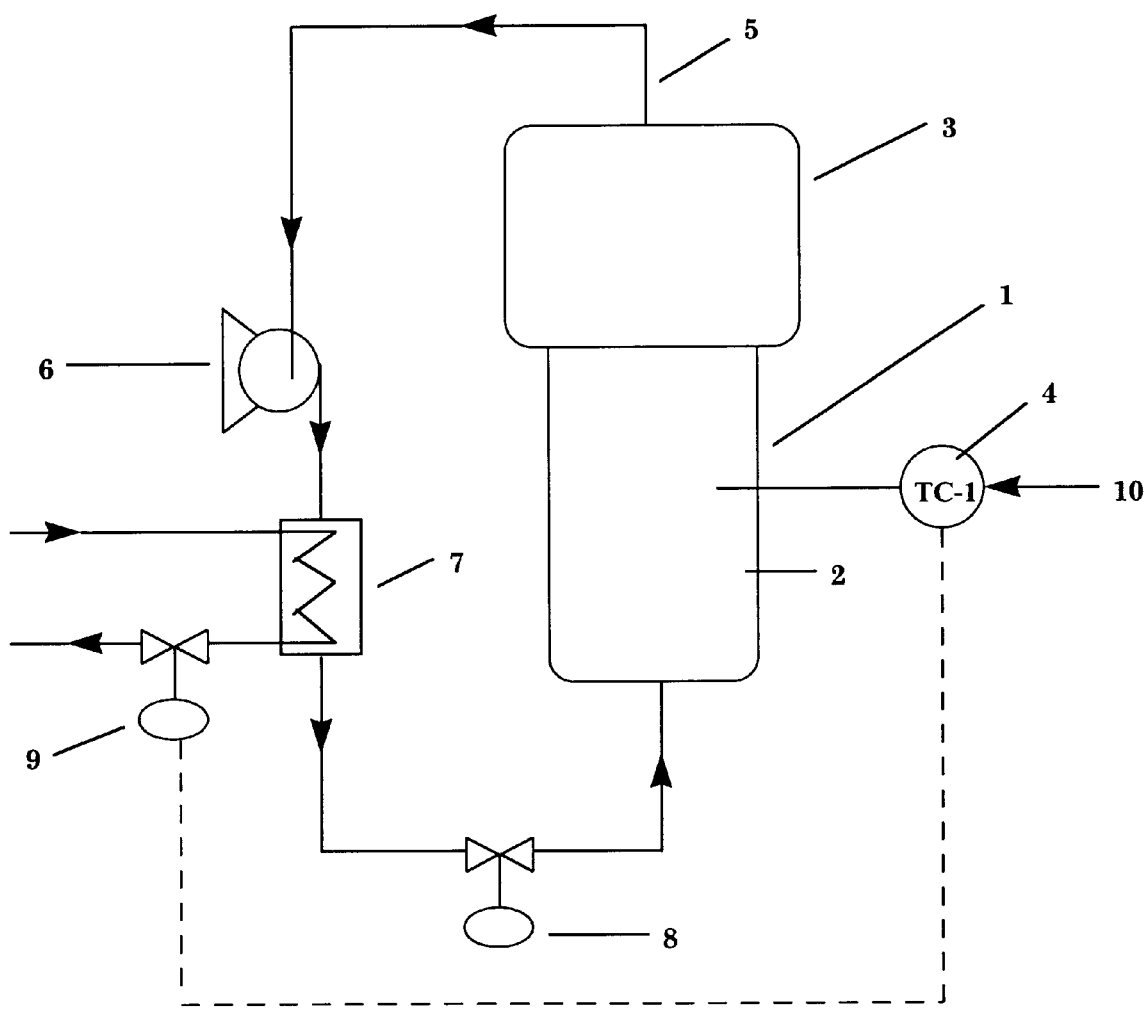
FIG. 1 is a schematic of the prior art method of bed temperature control wherein heat is removed from the fluidizing gas via a water cooled heat exchanger, i.e., water flow to a heat exchange system is manipulated to remove the cycle gas heat.

The polymer produced can be a homopolymer of an alpha-olefin, a copolymer of two or more alpha-olefins. Optionally, a nonconjugated diene can be included in the copolymer. Homopolymers of conjugated diolefins such as butadiene, isoprene, styrene and the like can also be produced using the process. Useful alpha-olefins generally have 2 to 12 carbon atoms, preferably 2 to 8 carbon atoms. Examples of alpha-olefins are ethylene, propylene, butene-1, hexene-1, 4-methyl-1-pentene, and octene-1.

The preferred homopolymers are polyethylene, polypropylene, polybutadiene, polyisoprene. Preferred copolymers include ethylene-propylene copolymer and ethylene-butene copolymer. Preferred diene containing terpolymers can include ethylene-propylene and a diene selected from the group consisting of ethylidene norbornene, octadiene including methyloctadiene (i.e., 1-methyl-1,6-octadiene and 7-methyl-1,6-octadiene), hexadiene, dicyclopentadiene, and mixtures thereof. Other such dienes are disclosed, for example, in U.S. Pat. No. 5,317,036. Polybutadiene, polyisoprene, polystyrene, butadiene-styrene copolymer, and butadiene-isoprene copolymer, and the like can be produced using the process of the invention. When dienes or diolefins are employed in the polymerization, preferably an inert particulate material such as those disclosed in U.S. Pat. No. 4,994,534 is employed. Such inert particulate materials can include, for example, carbon black, silica, clay, talc and mixtures thereof with carbon black, silica, and a mixture of them being most preferred. When an inert particulate material is employed in a polymerization, it is present in an amount ranging from about 0.3 to about 80 weight percent, preferably about 5 to about 75 weight percent, most preferably about 5 to about 50 weight percent based on the weight of the final polymer or elastomer product produced.

Any catalyst conventionally employed to produce the above-mentioned polymers can be used for polymerization in the process of the invention. Such catalysts can include Phillips catalysts, Ziegler catalysts, Ziegler-Natta catalysts containing transition metals such as vanadium, chromium, titanium, and metallocenes. Other catalysts can include compounds containing a rare earth metal, nickel, cobalt, anionic catalysts such as butyllithiums, and single site and single-site like catalysts. The catalysts can be supported, unsupported, soluble or in liquid form, spray dried, or prepolymerized. A mixed catalyst of two or more metal containing compounds or precursors can be used if desired.

Gas phase polymerizations of the invention can be conducted in conventional, condensed mode, including induced condensed mode, and liquid monomer mode processes. Such processes are disclosed, for example, in U.S. Pat. Nos. 4,540,755; 4,619,980; 4,735,931; 5,066,736; 5,244,987; 5,115,068; 5,137,994; 5,473,027; 4,450,758; 4,804,714; 4,994,534; 5,304,588; 5,317,036; 5,453,471; 5,543,399; 4,588,790; 5,352,749; 5,462,999; 5,453,471; and WO 96/04322 and WO 96/04323. The polymers produced in these processes are granular, free-flowing without the need for additional physical crushing or pulverizing. Polymers produced using inert particulate material additionally have a core-shell morphology as disclosed in U.S. Pat. No. 5,304,588.

In the invention, a fluidized bed is usually made up of the same granular resin that is to be produced in the reactor. Thus, during the course of the polymerization, the bed is comprised of formed polymer particles, growing polymer particles, and catalyst particles fluidized by polymerization and modifying gaseous or liquid components introduced at a flow rate or velocity sufficient to cause the particles to separate and act as a fluid. The fluidizing gas is made up of the initial feed, make-up feed, and cycle (recycle) gas, i.e., comonomers and, if desired, modifiers (e.g., optionally hydrogen) and/or inert carrier gas (e.g., nitrogen, argon, a $C_1$–$C_{12}$ alkanes such as ethane, methane, propane, butane, isopentane, and the like).

The parts of the reaction system are the vessel, the bed, inlet and outlet piping, one or more compressors, one or more cycle gas coolers (also referred to as heat exchanger (s)), and a product discharge system. In the vessel, above the bed, there is a velocity reduction (or disentrainment) zone, and in the bed there is a reaction zone. Both are above a gas distribution plate which is preferably also employed. Typical fluidized bed reactors and procedures are described in U.S. Pat. Nos. 4,482,687 and 4,302,565, respectively.

For the alpha olefin polymers, the product composition can be varied by changing the molar ratios of comonomers introduced into the fluidized bed. Products produced using any of the monomers are continuously discharged in granular or particulate form from the reactor as the bed level builds up with polymerization. The production rate is controlled in part by adjusting the catalyst feed rate. The hydrogen/monomer molar ratio or other reactant concentrations (e.g., comonomer feed, chain termination agent feed such as hydrogen or a poison such as oxygen) can be adjusted to control average molecular weights.

The residence time of the mixture of reactants including gaseous and liquid reactants, catalyst, and resin in the fluidized bed can be in the range of about 30 minutes to about 12 hours and is preferably in the range of about 30 minutes to about 5 hours.

The total pressure in the fluidized bed reactor can be in the range of about 100 to about 600 psi (pounds per square inch), and is preferably in the range of about 200 to about 450 psi. The partial pressure of the primary monomer or sole monomer is set to achieve certain product properties and reactor operating efficiencies. In general, trade-offs in reactor operating efficiencies such as, for example, loss of raw material and/or catalyst productivity are made to achieve certain product properties such as molecular weight and/or molecular weight distribution. When comonomers are present, the balance of the total pressure is provided by comonomers other than the primary monomer and/or an inert gas or gases such as nitrogen and inert alkanes. The temperature in the reactor can be in the range of about 10° C. to about 130° C., and is preferably in the range of about 35° C. to 120° C. The reactor is run in the continuous mode in which granular polymer is typically withdrawn in 600 to 5000 pound aliquots while the polymerization is in progress. In the continuous mode, the product discharge system is enabled after the bed weight typically builds to 40,000 to 180,000 pounds, and the rate of discharge is altered to maintain a desired bed level or bed weight.

A typical run in a gas phase or stirred fluidized reactor commences with monomer(s) being charged to the reactor and feeds adjusted until the desired gas composition is reached. An initial charge of cocatalyst is usually added prior to starting catalyst feeding in order to scavenge any poisons present in the reactor. After catalyst feed starts, monomer(s) are added to the reactor sufficient to maintain gas concentrations and ratios. Cocatalyst feed, when fed separately, is generally maintained in proportion to the catalyst feed rate. A start-up bed is generally used to facilitate stirring and dispersal of catalyst during the initial part of the operation.

In the process of the invention, the monomer(s) to be polymerized, an appropriate catalyst for producing the desired polymer, and type of reactor is made as well as process temperature, pressure, and residence time. Then the above-mentioned steps (i) to (viii) are performed. These steps can be accomplished with automatic controls (including analog or computerized controls) or manual controls, with automatic controls being preferred. Throughout the process, components and conditions are selected so as not to adversely affect reactor operation, resin properties, or violate the physical limitations of the reactor.

The present invention allows for substantially improved reactor bed temperature control by coordinated water cooling system and cycle gas flow manipulation. In the past, cycle gas manipulation has not been employed because it was believed that such manipulation would be disruptive to the fluidization inside the reactor. That is, lowering the rate of flow of the cycle gas to the reactor would cause the fluidized bed to defluidized or settle; conversely, raising the rate of flow of the cycle gas to the reactor would cause the fluidized bed to blow out the top of the reactor and/or trap polymer particles in the disentrainment section (also referred to as the expanded section) of the reactor. Both of these scenarios generally would result in costly reactor shutdown and the production of off-grade polymer product. In addition, it has been known that small changes to the cycle gas flow have little influence on the total heat removed from the reaction system. Changes in the cycle gas effect the bed temperature for only a short while, as the heat is removed from the reactor but not from the cooling cycle. Therefore, the changes to the cycle gas flow have only a temporary effect on the reactor bed temperature.

The present invention takes advantage of the quick, short-term effect of cycle gas manipulation in coordination with the slower, long-term effect of the water cooling system manipulation. In practicing the invention, cycle gas flow is moved about a target value, thereby maintaining a needed range of gas velocity. Cycle gas flow variations provide fast changes to the bed temperature, while water system manipulations provide heat removal from the system. The heat removal system is manipulated so as to force the bed temperature back to set point and the cycle gas flow back to target. Thus, the cycle gas flow rate varies between the rate which would settle or collapse the bed and the rate which would cause excessive entrainment and force a substantial portion of the bed out the top of the reactor.

The invention can be accomplished manually or using a variety of control structures. These methods include model-based control methods, as well as traditional analog type control methods. Commercially available model-based control methods, such as Dynamic Matrix Control, can be used when the reactor temperature response is appropriate. Analog type control methods can be applied over a broader range of process conditions. Proportional-Integral-Derivative (PID) and Proportional-Derivative (PD) controllers are simply employed, and represent a preferred method. In a preferred embodiment, the bed temperature/water valve controller (TC-1) is a PID controller, while the bed temperature/gas cycle valve controller (TC-2) is a PD controller. Such control functions are readily commercially available and can be obtained from Honeywell, Foxboro, ABB, and others.

A detailed explanation of the steps of the present invention employed to control bed temperature follows.

(i) Establishing limits for cycle gas flow to provide desired fluidization for the polymer being produced. A target cycle flow and allowable range are generally constant for a given set of product polymerization conditions. The target cycle flow and the acceptable range of cycle flow are both functions of the temperature, pressure, and composition of the cycle gas and the bed material characteristics. Bed material characteristics include particle size, resin density, stickiness, etc. A target value for cycle gas flow is established such that adequate fluidization of the reactor bed is maintained and such that there are no unacceptable levels of bed particles being carried out of the reactor into the cycle piping or into the entrainment section of the reactor. In the process of the invention, cycle gas flow is maintained within a range of about±20%, preferably about±10%, and most preferably about±5% of the target value. However, it has generally been found the movement of the cycle valve beyond±10% does not yield any additional benefits. Cycle flow is manipulated via a temperature controller (TC-2) output signal to the compressor inlet guide vanes. The temperature controller maintains the cycle gas flow range by means of upper and lower output clamps located in the controller. The preferred controller is a Proportional-Derivative Controller which manipulates the compressor(s) guide vanes. The zero-error/zero derivative output of the controller produces the target cycle flow.

(ii) Establishing desired reactor bed temperature. The desired reactor bed temperature is influenced by the type of polymer being produced and/or the monomer(s) being fed to the reactor, as well as type and size of the reactor employed. Typically, an optimum temperature is known for any particular given polymerization resin properties.

(iii) Determining the actual bed temperature as polymerization progresses. The actual bed temperature can be monitored and observed as the polymerization progresses. An increase in temperature generally results in an increase in reaction if other variables such as cycle gas flow and cooling water flow remain the same. A decrease in temperature generally results in a decrease in the reaction if variables such as cycle gas flow and cooling water flow remain the same. The typical polymerization is an exothermic reaction. Increased reaction produces more heat in the reactor which continues to increase the reaction and heat up the cycle gas. The actual bed temperature can be determined using devices such as thermocouples which are placed in the wall of the reactor.

(iv) Determining the water flow valve position required to (a) bring the bed temperature into line with desired bed temperature and (b) bring the cycle gas valve position/flow to the target cycle gas valve position. The water flow position required to bring the bed temperature into line with the desired bed temperature and the cycle gas valve position to the target setting is determined by a process heat-balance or response model (in the case of model based control) and/or controller tuning parameters.

(v) Determining the cycle gas valve position required to bring the actual bed temperature in line with desired bed temperature. The cycle gas valve position is determined by a process model and/or controller tuning parameters.

(vi) If there is an inner loop, then determine the valve position to give desired cycle flow. In the process of the invention this is accomplished by use of a flow controller connected to a flow manipulating device (e.g., valve).

(vii) manipulating water valve and cycle gas valves by amounts necessary to satisfy the preceding steps.

Manipulation is accomplished by final control elements, such as valves.

Optionally (viii) adjusting the target cycle gas velocity position to effect reactor fluidization properties. This step would be performed when improved overall reactor operation can be achieved, such as higher overall rates or reduced resin entrainment. The adjustment of the target cycle gas velocity position is done by an operator or a higher-level control system.

The advantages of the above-described process are that the production rate can be increased, i.e., up to about 10%, the production rate and resin properties can be kept closer to the desired values, and overall operating costs can be reduced by lowering the needed amount of Induced Condensing Agents (ICAs) or other materials.

Patents mentioned in this specification are incorporated by reference herein.

The invention is illustrated by the following examples. Amounts are in weight percent unless otherwise specified.

EXAMPLES

Example 1(Comparative)

Figure 2:
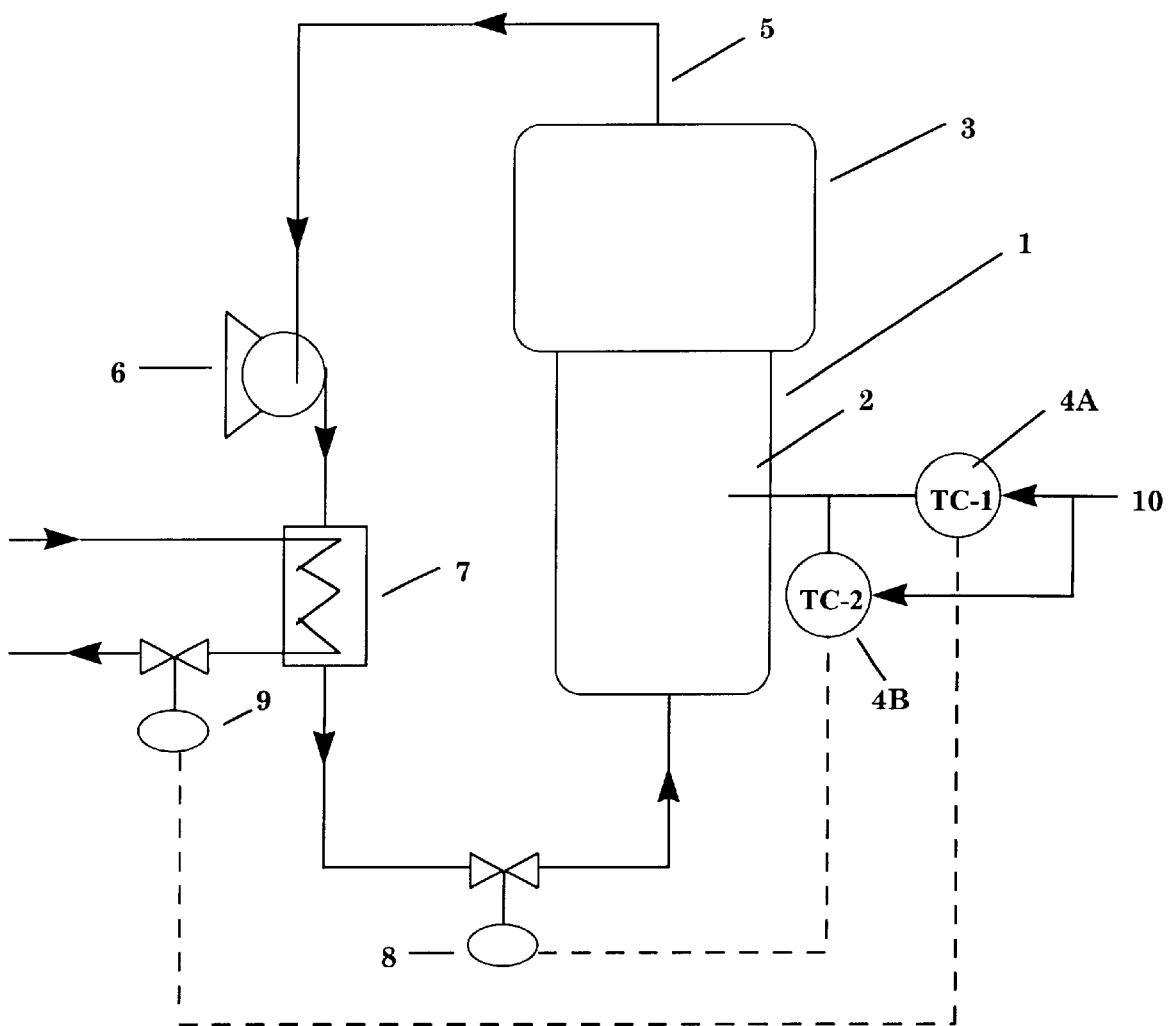
FIG. 2 is a schematic of the present inventive process for bed temperature control wherein heat is removed from the fluidizing gas via a water cooled heat exchanger by manipulating both the water flow rate to the heat exchange system and the cycle gas flow rate to the fluidized reactor.
Figure 3:
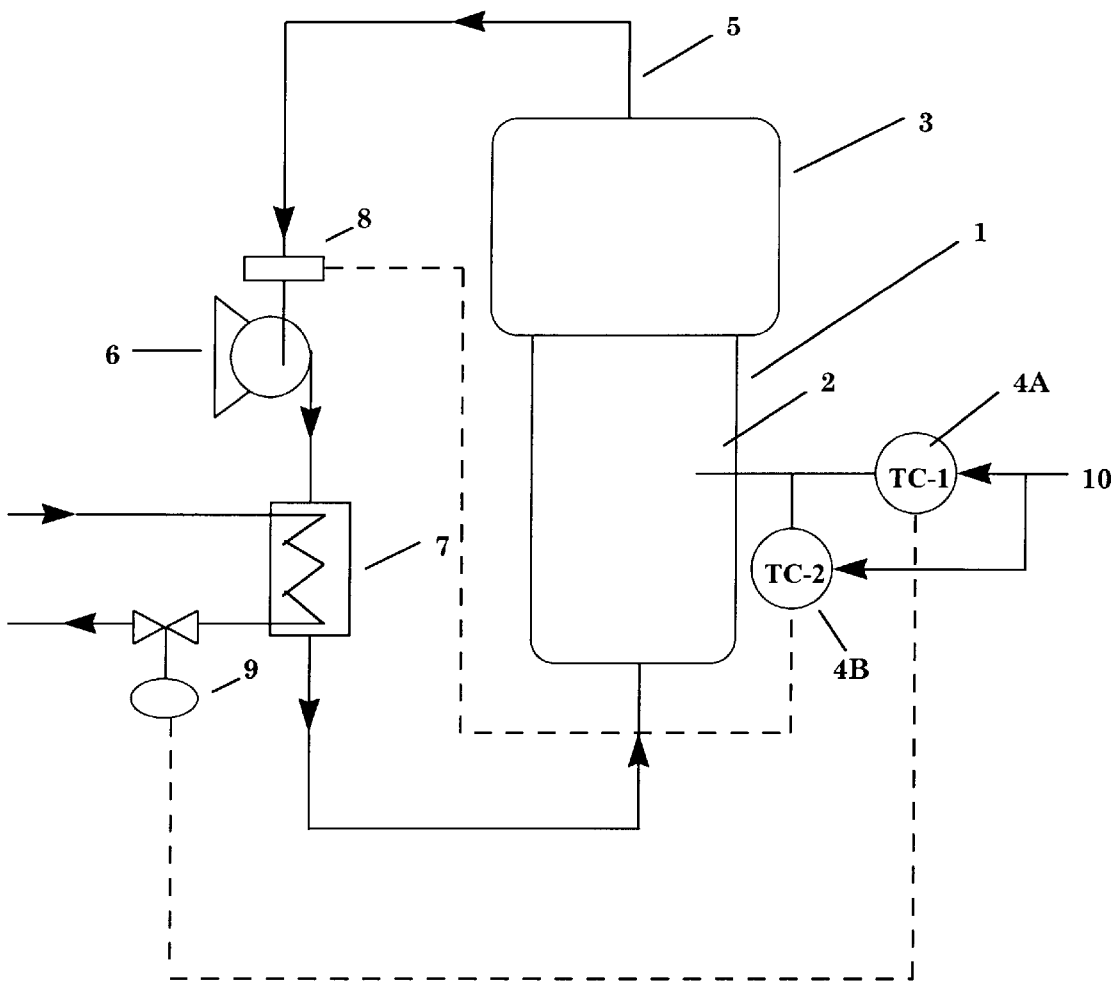
FIG. 3 is a schematic of the reactor system and method of Example 1. The numbering is the same as in FIGS. 1 and 2, except that 8=compressor inlet guide vanes.

A polymerization of ethylene and 1-butene using a supported chromium catalyst is carried out in a gas phase fluidized bed reactor. The reactor is operated continuously with a total pressure ranging from about 298 to 312 psig and a temperature ranging from about 88.5 to 90.5° C. The gas composition, by weight is 79 to 83.6% ethylene; 5.6 to 6.25% 1-butene; less than 0.025% hydrogen; the rest being nitrogen, ethane, methane, hexane. The polymerization test period was run for 8 hours. The process control strategy was as show in FIG. 3 with controller TC-2 in manual mode. The numbering of the elements in FIG. 3 is the same as in FIGS. 1 and 2, except that number 8 refers to the compressor inlet guide vanes.

The following actions were taken:

(1) The traditional method of bed temperature control was employed, as described previously.

(2) Cycle gas flow was maintained constant by fixing the compressor guide vane position. The process control strategy was as shown in FIG. 3 with controller TC-2 in manual mode.

(3) Temperature control performance was monitored. The standard deviation in bed temperature was 0.48.

Example 2

The polymerization of Example 1 was repeated, except that the invention was employed with a target guide vane output of 14.4% and output clamp of +/−0.9%. Control was achieved using the structure shown in FIG. 3, with controller TC-2 in the automatic mode.

The standard deviation in the bed temperature was 0.36. When compared with the result in Example 1, this is a 25% improvement in the reduction of bed temperature variation. This improvement in bed temperature control is used to operate the reactor closer to operating constraints, thereby improving resin quality and reducing the amount of off-grade resin produced during continuous polymerization in gas phase fluidized reactor operations. These actions of the invention also resulted in improved reactor operability.

What is claimed is:

1. A continuous process for the polymerization of (a) one or more alpha olefins, and optionally at least one diene, or (b) a diolefin in a gas phase in a fluidized bed reactor or a stirred fluidized bed reactor having a means for manipulating cooling of the cycle gas, in the presence of a polymerization catalyst, optionally in the presence of inert particulate material, under polymerization conditions including a target reaction temperature, pressure, recycle flow rate, cooling water flow rate for desired resin properties, comprising the steps of:

(i) establishing limits for cycle gas flow to provide desired fluidization;

(ii) establishing desired reactor bed temperature;

(iii) determining the actual bed temperature as the polymerization reaction progresses;

(iv) determining the water flow valve position required to (a) bring the actual bed temperature into line with desired reactor bed temperature, and (b) bringing the cycle gas flow valve position to the target cycle gas valve position;

(v) determining the cycle gas flow valve position required to bring the actual bed temperature in line with desired reactor bed temperature;

(vi) manipulating water valve and cycle gas flow valve by amounts necessary to satisfy the proceeding steps; and (vii) adjusting the target cycle gas valve position to effect reactor bed fluidization.

2. The process of claim 1 wherein the reactor bed temperature is in the range of about 10 degrees C. to about 130 degrees C. and the pressure is in the ranged of about 100 psi to about 600 psi.

3. The process of claim 1 wherein the polymer produced is selected from the group consisting of an ethylene homopolymer, a propylene homopolymer, a copolymer of ethylene and a $C_3$–$C_{12}$ alpha olefin, a terpolymer of ethylene, a $C_3$–$C_{12}$ alpha olefin, and a diene, polybutadiene, and polyisoprene.

4. The process of claim 1 wherein the cycle gas flow rate varies between the rate which would settle or collapse the bed and the rate which would cause excessive entrainment and force a substantial portion of the bed out the top of the reactor.

5. The process of claim 4 wherein the cycle gas flow rate is±20% of a fixed value for cycle gas flow for a polymerization of a designated polymer.

6. The process of claim 5 wherein the cycle gas flow rate is±10%.

7. The process of claim 5 wherein the cycle flow rate is manipulated using a temperature controller output signal to the compressor inlet guide vanes.

8. The process of claim 7 wherein the temperature controller is a proportional derivative controller.

9. The process of claim 7 wherein the bed temperature/water valve controller is a proportional-integral-derivative and the bed temperature/gas cycle valve controller is a proportional derivative controller.

10. The process of claim 1 wherein the polymerization is conducted in condensing mode or induced condensing mode.

* * * * *